United States Patent [19]
Stein et al.

[11] Patent Number: 6,095,536
[45] Date of Patent: Aug. 1, 2000

[54] RACING SULKY

[76] Inventors: Craig Stein, 8795 Crow Dr., Macedonia, Ohio 44067; Aaron L. Mulrooney, 3064 W. Edgerton Rd., Silver Lake, Ohio 44224

[21] Appl. No.: 09/430,224

[22] Filed: Oct. 29, 1999

[51] Int. Cl.$^7$ ........................................................ B62C 1/08
[52] U.S. Cl. .................................. 280/63; 280/64; 280/65
[58] Field of Search ................................... 280/63, 64, 65

[56] References Cited

U.S. PATENT DOCUMENTS

| | | |
|---|---|---|
| 487,343 | 12/1892 | Bald . |
| 502,984 | 8/1893 | McIntosh et al. . |
| 506,414 | 10/1893 | Caffrey . |
| 521,460 | 6/1894 | Elliott . |
| 615,447 | 12/1898 | Greutman . |
| 643,728 | 2/1900 | Payne . |
| 762,038 | 6/1904 | Frazier . |
| 970,828 | 9/1910 | Hubbard . |
| 3,163,438 | 12/1964 | Bliss ......................................... 280/43 |
| 3,256,125 | 6/1966 | Tyler ........................................ 156/184 |
| 3,388,921 | 6/1968 | Picard ....................................... 280/63 |
| 3,907,325 | 9/1975 | Gaines et al. ............................. 280/63 |
| 3,942,305 | 3/1976 | Cameron ...................................... 54/2 |
| 4,033,598 | 7/1977 | King .......................................... 280/63 |
| 4,071,257 | 1/1978 | Discount ...................................... 280/3 |
| 4,095,815 | 6/1978 | Mitchell ..................................... 280/63 |
| 4,135,730 | 1/1979 | Yunick ....................................... 280/65 |
| 4,313,611 | 2/1982 | Heinze, Jr. et al. ....................... 280/63 |
| 4,326,367 | 4/1982 | Cashman ...................................... 54/2 |
| 4,667,973 | 5/1987 | Bowers ....................................... 280/63 |
| 4,817,975 | 4/1989 | Saraydar ..................................... 280/63 |
| 4,863,180 | 9/1989 | Guarino et al. ............................ 280/63 |
| 5,183,279 | 2/1993 | Acerno et al. ............................. 280/63 |
| 5,265,891 | 11/1993 | Diehl ........................................ 280/1.5 |
| 5,308,092 | 5/1994 | Kiraly ...................................... 278/118 |
| 5,607,170 | 3/1997 | Capjon et al. ............................. 280/63 |
| 5,857,686 | 1/1999 | Millington ................................. 280/63 |

FOREIGN PATENT DOCUMENTS

3413289 A1   4/1984   Germany .

*Primary Examiner*—Christopher P. Ellis
*Assistant Examiner*—Rashmi Sharma
*Attorney, Agent, or Firm*—Renner, Kenner, Greive, Bobak, Taylor & Weber

[57] ABSTRACT

A racing sulky to be drawn by a horse, the sulky including a pair of rails (12) each having a first end (16) and a second end (18). From the second end (18), a first segment (28) extends forwardly and inwardly, a second segment (30) extends forwardly and outwardly from the first segment (28) and creates a first bend (22) therebetween. A third segment (32) extends inwardly toward a centerline CL from second segment (30) and creates a second bend (24) therebetween. The first, second, and third segments (28, 30, and 32) extend upwardly at the same angle, and a fourth segment (34) extends forwardly, outwardly, and downwardly from the third segment (32) terminating at the first end (16). A transverse member (36) spans the rails (12) and is attached to the second ends (18) of the rails (12). The transverse member (36) extends laterally beyond the second ends (18), and terminates in a pair of transverse member ends (38). A pair of outer struts (50) extend downwardly from each of the transverse member ends (38), and a pair of inner struts (51) spaced inwardly from the transverse member ends (38) also extend downwardly from the transverse member (36). A wheel (52) is rotatably mounted between each of the inner and outer struts (51 and 50). A pair of outer support arms (56) extend upwardly and inwardly from a lower end (54) of the outer struts (50) and attach to rails (12) at about or rearwardly of the second bend (24). A pair of inner support arms (56) extend upwardly from the inner struts (51), and attach to the outer support arms (56). A seat (42) located between the rails (12) extends rearwardly and downwardly from said transverse member (36). When seat (42) is so angled, the driver is held in an aerodynamic position, reducing the drag on the horse.

17 Claims, 3 Drawing Sheets

RACING SULKY

TECHNICAL FIELD

This invention relates generally to a horse drawn sulky. More particularly, this invention relates to a racing sulky to be drawn by a trotting or pacing horse in harness racing competition.

BACKGROUND OF THE INVENTION

In harness racing, a trotting or pacing horse closely draws a two-wheeled sulky or "bike" which supports a driver on a seat positioned between two (2) co-axially arranged wheels. The basic components of the sulky typically include two (2) forward extending spaced apart shafts attached at the rear to a wheel and seat support assembly. The horse is positioned between the two (2) shafts, which are attached to a saddle positioned at the horse's front shoulders or withers.

Speed and maneuverability are primary concerns in the design and construction of racing sulkies. Until now, however, little attention has been given to improving the design, construction and aerodynamics of racing sulkies to reduce overall resistance to the horse's forward motion and thereby increase racing speed.

More recent sulky designs comprise a pair of spaced apart generally longitudinally extending shafts extending forwardly from a transverse member on which the sulky's wheels are mounted. The rear portions of the shafts are attached to the transverse member. However, the shafts are spread wide apart over their entire length to accommodate the width of the horse. As a consequence, the shafts are in the air stream created by the horse as it runs, causing some wind resistance. Also, the rear portions of the shafts, upon which stirrups are mounted, are spaced uncomfortably far apart, requiring the driver to spread his legs appreciably in order to put his feet in the stirrups.

A driver's seat extends horizontally and rearwardly from the transverse member. As a consequence, the driver is held upright with his upper body perpendicular to the forward motion of the cart. In this position, the driver's upper body creates significant wind resistance. To reduce resistance, some drivers may lean rearwardly reducing the amount of wind resistence. But, this position is difficult for the driver to physically maintain, particularly while seeking to maintain control over both the horse and sulky.

Therefore, a need exists for a sulky that reduces resistance to the horse's forward motion while maintaining adequate stability and maneuverability. There is still a further need for a sulky that holds the driver in a stable seated position that reduces wind resistance created by the driver.

SUMMARY OF THE INVENTION

It is therefore an object of the present invention to provide a racing sulky that reduces resistance to the horse's forward motion.

It is another object of the present invention to provide a racing sulky that reduces the intrusion of the shafts into the airstream created by the horse as it runs.

It is another object of the present invention to provide a racing sulky that holds the driver in a more aerodynamic position than in the past.

It is another object of the present invention to provide a racing sulky having forks that extend from the transverse member at an angle that is not perpendicular to the transverse member, thereby holding the driver in an aerodynamic position.

It is another object of the present invention to provide a racing sulky having a seat that extends rearwardly from the transverse member and downwardly from the transverse member, such that the driver is held in an effective aerodynamic position.

The foregoing and other objects of the present invention, which shall become apparent as the detailed description proceeds, are achieved by a racing sulky comprising a pair of rails, each having a first end and a second end, a transverse member attached to and interconnecting the second ends, the transverse member extending laterally outwardly beyond the second ends, a seat attached to the transverse member between the rails, a pair of struts extending downwardly and forwardly from each end of the transverse member, and a wheel rotatably mounted in each of the pair of struts.

Other aspects of the present invention are attained by a racing sulky to be drawn by a horse, the sulky comprising a pair of rails each having a first end and a second end, a first segment extending forwardly and inwardly from the second end, a second segment extending forwardly and outwardly from the first segment creating a first bend therebetween, and a third segment extending axially inwardly from the second segment and creating a second bend therebetween, wherein the first, second, and third segments extend upwardly at the same angle, a fourth segment extending forwardly, outwardly, and downwardly from the third segment and creating a third bend therebetween and terminating at the first end, a transverse member attached to the second ends spanning the rails, extending beyond the second ends, and terminating in a pair of transverse member ends, a pair of outer struts extending downwardly from each of the transverse member ends, a pair of inner struts spaced inwardly from the transverse member ends and extending downwardly from the transverse member, a wheel rotatably mounted between each of the inner and outer struts, a pair of outer support arms extending upwardly and inwardly from the outer struts and attaching to the rails at about the second bend, a pair of inner support arms extending upwardly from the inner struts and attaching to the outer support arms, and a seat located between the rails extending rearwardly from the transverse member.

Still another object of the present invention is attained by a racing sulky to be drawn by a horse, comprising a transverse member having two ends and a middle portion, a pair of struts extending downwardly from each end of the transverse member, a pair of wheels rotatably mounted within the struts, a seat mounted to the middle portion of the transverse member and extending rearwardly therefrom, and a pair of rails forwardly extending from the transverse member, the rails having a first segment extending upwardly from the transverse member, a second segment extending inwardly from the first segment, a third segment extending outwardly and downwardly from the second segment, and a forth segment extending downwardly and outwardly relative to the third segment.

These and other objects of the present invention, as well as the advantages thereof over existing prior art forms, which will become apparent from the description to follow, are accomplished by the improvements hereinafter described and claimed.

DETAILED DESCRIPTION OF THE INVENTION

One representative form of a racing sulky embodying the concepts of the present invention is designated generally by numeral 10 on the accompanying drawings. Racing sulky 10 may be constructed of chrome-molybdenum, other metals, polymeric materials, wood, or combinations thereof. Similarly, the materials of the various components making up a racing sulky 10 may vary with respect to one another, depending on the conditions affecting that particular component.

Figure 1:
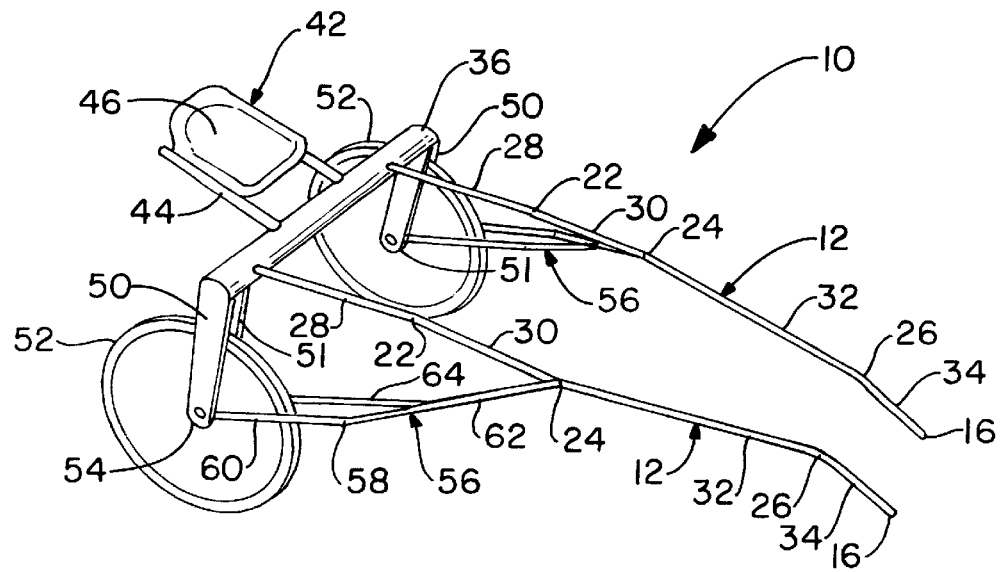
FIG. 1 is a perspective view of the racing sulky according to the present invention.
Figure 2:
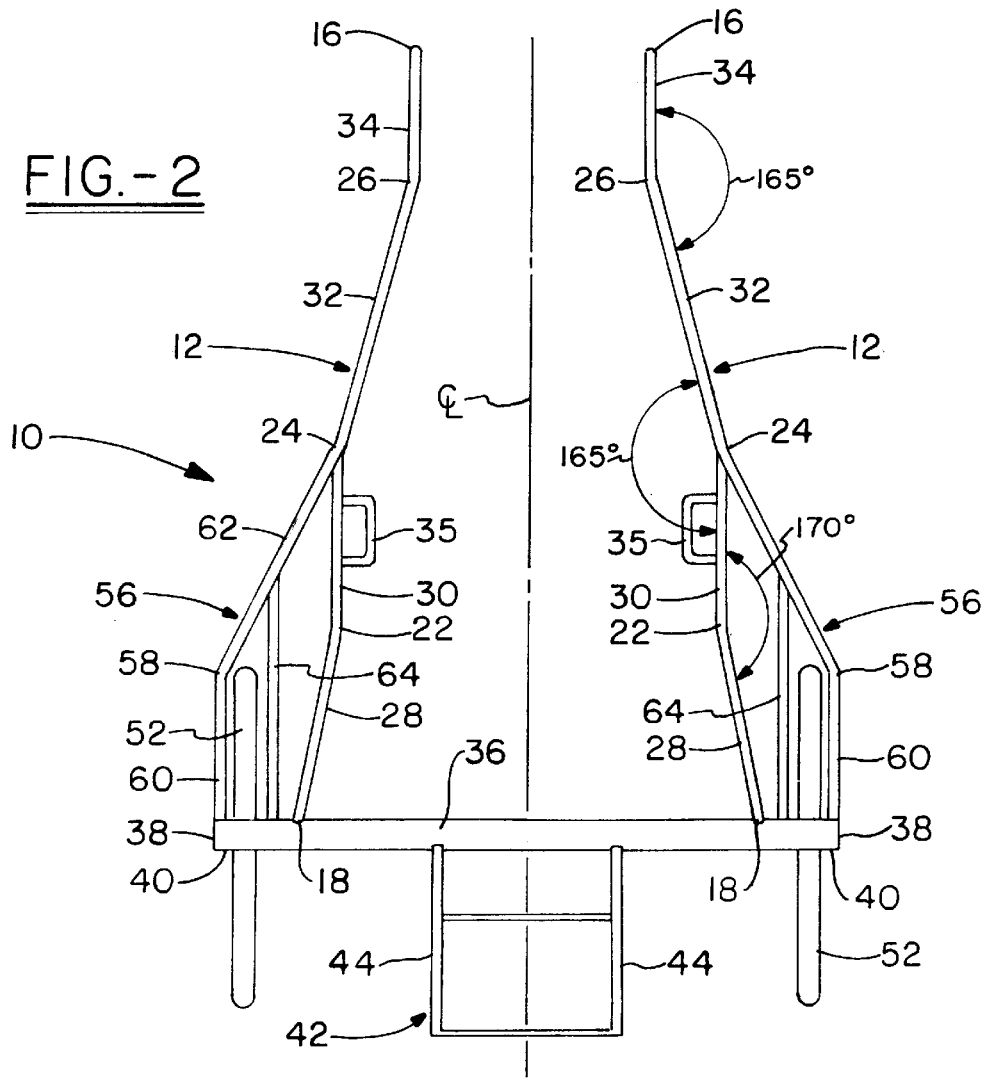
FIG. 2 is a top plan view of the racing sulky.

With reference to FIGS. 1 and 2, racing sulky 10 is symmetrical with respect to a longitudinally extending center line CL. Racing sulky 10 includes a pair of generally longitudinally extending and spaced apart rails 12, which are symmetrical about center line CL. Rails 12 may be mirror images of each other. Each rail has two opposite ends, namely, a first end 16 and second end 18. The second end 18 is generally at or near the rear portion of the racing sulky 10.

Figure 3:
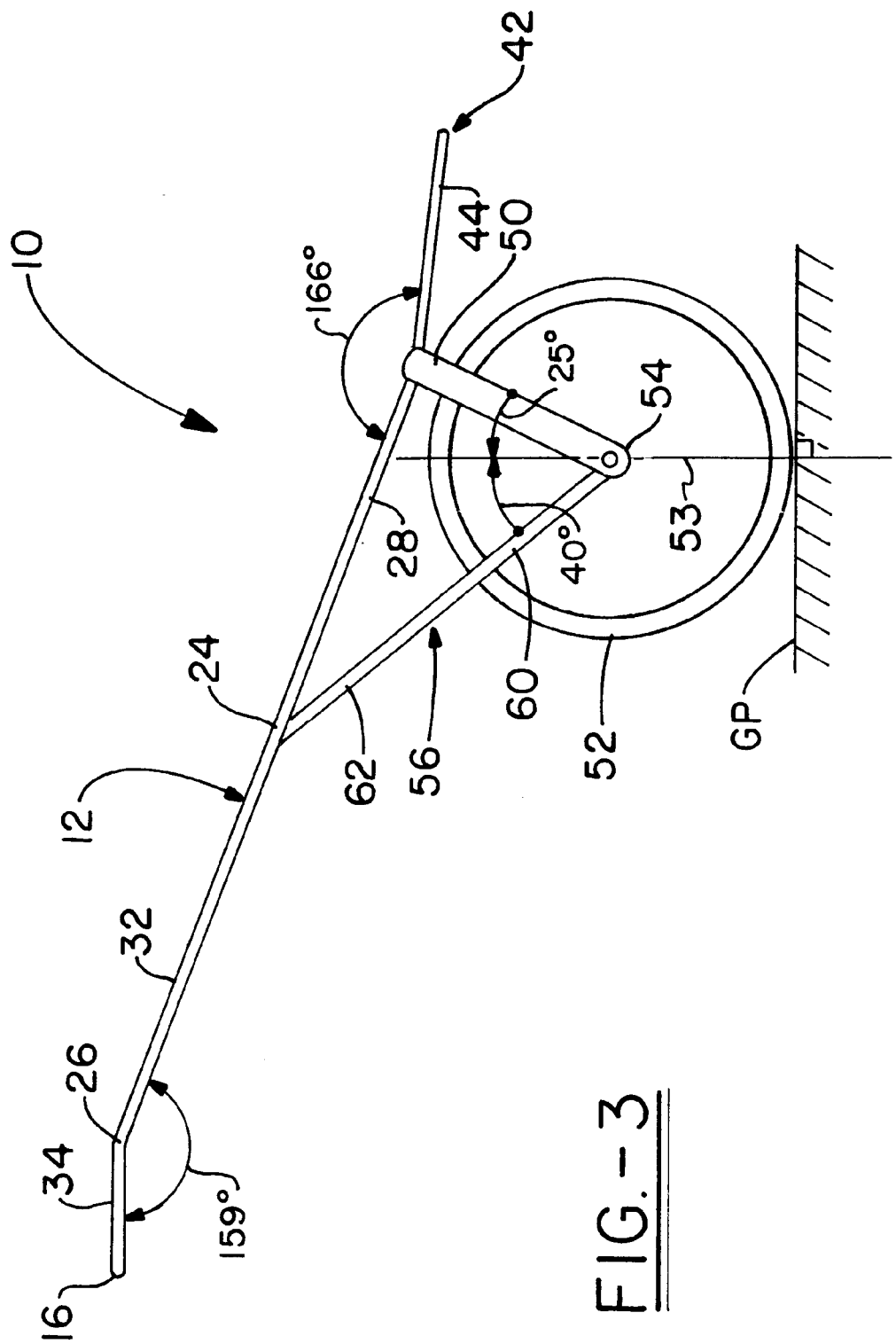
FIG. 3 is a side elevational view of the racing sulky oriented as if attached to a horse with the driver shown in phantom.

Each rail 12 includes a plurality of spaced bends. These bends, from the second end 18 to the first end 16, are: an outward bend 22, an inward bend 24, and an outward bend 26. These bends divide rails 12 and 14 into a plurality of segments, namely, a first segment 28 extending from second end 18 to first bend 22, a second segment 30 extending from first bend 22 to second bend 24, a third segment 32 extending from second bend 24 to third bend 26, and a fourth segment 34 extending from third bend 26 to first end 16. As best shown in FIG. 3, first, second, and third segments 28, 30, 32 extend upwardly relative to a plane parallel to the ground or ground plane GP. Fourth segment 34 extends outwardly and downwardly from third segment 32 and is substantially parallel to ground plane GP.

While the rails have been described in terms of segments, rails 12 may be unitary structures in which adjacent segments are integrally joined at the bends by weldments or, alternatively, the rails may each comprise a single tubular member. With respect to the center line CL, first and third segments 28, 32 extend inwardly towards center line CL, and second segment 30 is substantially parallel to center line CL or may extend slightly inwardly. Fourth segment 34 of rails 12 is substantially parallel to center line CL.

It should be understood that the spacing of rails 12 at each segment may be varied to a large extent based on the horse size, rider size, comfort, or bike stability. A representative spacing between the rails at the transverse member 36 is about 44 inches. In similar fashion, the angle of each bend may vary as needed. Representative angles in the horizontal plane for each rail 12 maybe about 155°–175°, and preferably about 170° at first bend 22, about 155°–175°, and preferably about 165° at second bend 24, and about 155°–175°, and preferably about 165° at third bend 26. In the vertical plane, side rail 12 makes an angle of about 140°–170°, and preferably about 159° between third and fourth segments 32 and 34. Representative segment lengths are about 18 inches for first segment 28, about 17.5 inches for second segment 30, about 27 inches for third segment 32, and about 13 inches for fourth segment 34.

Stirrups 35 may be attached to rails 12 and, as shown in FIG. 2, are preferably located on either first segment 28 or second segment 30. More preferably, stirrups 35 are located on second segment 30 of rails 12 and extend inwardly therefrom. Since second segment 30 may be located closer to center line CL, placing stirrups 35 on second segment 30 brings the stirrups closer together, reducing the distance that the driver's legs are spread. A representative spacing between stirrups 35 as they extend inwardly from rails 12 is about 30 inches.

Second ends 18 of rails 12 attach to a transverse member 36. The transverse member 36 extends beyond second ends 18 and terminates in a transverse member end 38 forming an end portion 40 therebetween. It should be understood that second end 18 may be moved inwardly to the point of changing bend 22 from an inward bend to an outward bend. Accordingly, the length of transverse member 36 would be shortened along with the end portion 40. End portion 40 is sized to provide sufficient room for support struts and wheels mounted thereon, as will be described below. A representative transverse member length is about 60 inches, with about a 12 inch space between the support struts. As best shown in FIG. 1, transverse member 36 may have an aerodynamic profile, such as an airfoil shape to reduce drag. The airfoil transverse member cross-section may be best described as a stretched tear-drop shape lain on its side with the bottom of the tear-drop as the leading edge.

Figure 4B:
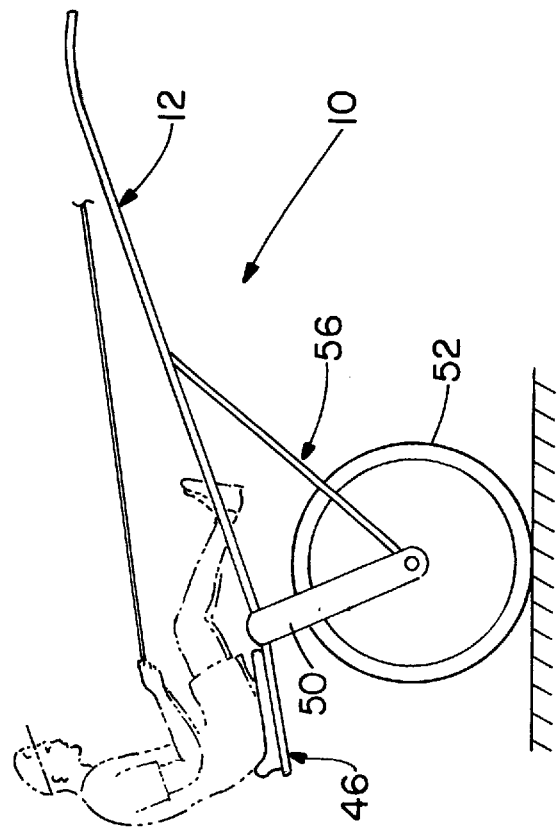
FIG. 4B is a side elevational view of the present invention with the driver shown in phantom lines.
Figure 4A:
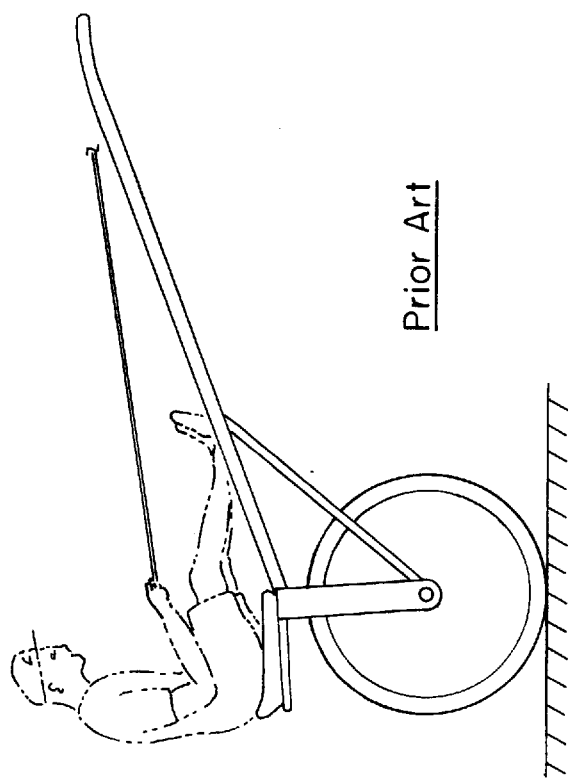
FIG. 4A is a side elevational view of a prior art sulky with the driver shown in phantom lines.

With reference to FIG. 2, a seat 42 may be attached to transverse member 36, preferably between second ends 18 of rails 12. The seat 42 may be attached in any conventional manner, or integrally formed with transverse member 36. As shown, seat 42 includes a pair of seat supports 44 and a seat portion 46 spanning the seat supports 44. As best shown in FIG. 3, when in use, the seat 42 extends rearwardly and downwardly from the transverse member 36 at an angle depending away from the horizontal. With respect to side rails 12, seat 42 extends rearwardly and upwardly. A representative angle between side rail 12 and seat 42 maybe about 150°–175°, and preferably about 166°. As best shown in FIG. 4B, when the driver is seated on seat 42, this angle places the driver in a partially reclined position that reduces the wind resistance created by the driver. While not completely understood, it is believed that the reclined position of the driver presents reduced cross-sectional area perpendicular to the motion of the bike. Moreover, the reclined position is believed to cause the driver's upper body to act as an air foil as shown in FIG. 4B, in contradistinction to an effective air shield as shown in FIG. 4A of the prior art.

To further place the driver in a more aerodynamic position, struts 50 and 51 may be angled toward the front of the racing sulky 10. With reference to FIG. 3, the wheel struts 50 and 51 extend downwardly from end portion 40 of transverse member 36. An outer strut 50 is located at transverse member end 38 and an inner strut 51 is spaced inwardly along transverse member 36 from the outer strut. Struts 50 and 51 may extend generally vertically from transverse member 36, or they may be angled slightly to alter a driver's position or the weight distribution of the racing sulky 10. By extending struts 50 and 51 downwardly and forwardly from end portion 40, the driver is further reclined. Moreover, this angle moves a majority of the racing sulky's weight behind the center of wheels 52, as will be described more fully below. The amount of space between outer and inner struts 50 and 51 depends on the width of wheel 52. A representative spacing may be between about 6–15 inches, and preferably about 12 inches with the inner struts 51 spaced from about 40–60 inches, and preferably about 48" apart from each other. Wheel 52 is fastened in a conventional manner to struts 50 and 51 at lower end 54.

Since the wheel 52 is fastened to the lower end 54 of struts 50, which may be angled toward the forward end of racing sulky 10, a majority of the racing sulky's weight is placed behind a wheel center 53 when the struts 50 and 51 are so angled. It is believed that the center of gravity for the sulky extends through a point behind wheel centers 53. It should be understood that the center of gravity may be shifted behind wheel center 53 by otherwise placing a majority of the sulky's weight behind wheel center 53. Angling the struts 50, 51 forward, thereby moving the wheel center 53 forward is preferred to maintain the sulky in a more compact configuration. When the struts 50, 51 are angled toward the front of racing sulky 10, the centerline 53 extends downwardly through the transverse member 36 and behind a wheel center represented by center line 53. The angle of the struts 50 and 51 may be about 0°–50°, more preferably 15°–45°, and most preferably about 25° clockwise from vertical. With the center of gravity so situated, racing sulky 10 exerts an upward force upon the horse when it is attached. When the driver is seated in the racing sulky 10, the upward force is magnified. Since the rails 12 act as a lever and the weight of the driver is positioned well behind the fulcrum of the interconnection of the struts 50, 51 to their respective wheels 52. Beneficially, this upward force lightens the effective load on the horse and serves to make the horse feel lighter on its feet.

To provide additional stability, an outer support member 56 may extend upwardly from lower end 54 to side rail 12 and attach thereto at approximately the second bend 24 of side rail 12. Referring to FIG. 2, outer support member 56 has two segments joined by a inward bend 58. In the vertical plane, both of the segments of outer support member 56 extend upwardly at the same angle, but in the horizontal plane (FIG. 2) the first segment 60 extends forwardly parallel to center line CL and second segment 62 extends forwardly and inwardly from first segment 60.

An inner support member 64 extends from lower end 54 of inner strut 51 and may attach to second segment 62 of outer support member 56. By attaching inner support member 64 to the second segment 62 of outer support member 56 instead of attaching it directly to rail 12, the length of inner support member 64 is reduced. The reduced amount of inner support member material beneficially reduces the sulky's weight. Inner support member 64 may extend upwardly at the same angle as outer support member 56, as shown. Inner support member 64 extends toward the front of racing sulky 10 parallel to outer support member 56.

Both inner and outer support members 64, 56 serve to further stabilize struts 50, 51. The support members 64, 56 prevent distortion of struts 50, 51, which could affect wheel alignment or rotation. For example, any torsion of struts 50, 51 may cause the direction of the wheels 52 to fall out of parallel alignment with the center line CL. The misaligned wheels would hinder the motion of the sulky 10, reducing its top speed and acceleration. Flexion of struts 50,51 may similarly cause misalignment as described above, or may cause one wheel 52 to rest at a different elevation than the other wheel, again, resulting in misdirection and/or reduced performance. Finally, if struts 50, 51 flex inwardly, the struts may squeeze the wheels 52 increasing the frictional forces opposing the rotation of the wheels 52. Stabilizing struts 50, 51 and maintaining good wheel alignment allows the racing sulky 10 to track or follow the horse more readily. Improved tracking may be recognized by the driver as increased responsiveness when turning or, in general, as improved maneuverability.

Thus, it can be seen that the objects of the invention have been satisfied by the structure and its method for use presented above. While only one embodiment has been presented and described, it is to be understood that the invention may be modified without deviating from the spirit of this invention. Accordingly, for an appreciation of the scope and breadth of the invention, reference should be made to the following claims.

What is claimed is:

1. A racing sulky to be drawn by a horse, the sulky comprising:

a pair of rails each having a first end and a second end;

a first segment extending forwardly and inwardly from said second end, a second segment extending forwardly and outwardly from said first segment creating a first bend therebetween, and a third segment extending axially inwardly from second segment creating a second bend therebetween, wherein said first, second, and third segments extend upwardly at the same angle and wherein a reduction in aerodynamic drag is provided during operation of the racing sulky;

a fourth segment extending forwardly, outwardly, and downwardly from said third segment, creating a third bend therebetween and terminating at said first end;

a transverse member attached to said second ends spanning said rails, extending beyond said second ends and terminating in a pair of transverse member ends;

a pair of outer struts extending downwardly from each of said transverse member ends;

a pair of inner struts spaced inwardly from said transverse member ends and extending downwardly from said transverse member;

a wheel rotatably mounted between each of said inner and outer struts; and a seat located between said rails extending rearwardly from said transverse member.

2. The racing sulking of claim 1, further comprising:

a pair of outer support arms extending upwardly and inwardly from said outer struts and attaching to said rails at about said second bend; and a pair of inner support arms extending upwardly from said inner struts, and attaching to said outer support arms.

3. The racing sulking of claim 1, wherein said segments and bends cooperate to form curved rails.

4. The racing sulky of claim 3, further comprising a pair of stirrups attached to said rails located inwardly from and adjacent to said second bends.

5. The racing sulky of claim 4, wherein said struts extend downwardly and forwardly from said transverse member.

6. A racing sulky to be drawn by a horse, comprising:

a transverse member having two ends and a middle portion;

a pair of struts extending downwardly from said transverse member;

a pair of wheels rotatably mounted within said struts;

a seat mounted to said middle portion of said transverse member and extending rearwardly therefrom; and a pair of rails forwardly extending from said transverse member said rails having a first segment extending inwardly from said transverse member, a second segment extending outwardly from said first segment, a third segment extending inwardly from said second segment, and a fourth segment extending downwardly and outwardly relative to said third segment wherein a reduction in aerodynamic drag is provided during operation of the racing sulky.

7. The racing sulky of claim 6, further comprising an outer support arm attached to said struts at one end extending upwardly and inwardly from said struts attaching to said rails at an opposite end of said support arm.

8. The racing sulky of claim 6, wherein said struts at least partially extend toward the front of the racing sulky.

9. The racing sulky of claim 8, wherein said seat extends rearwardly and downwardly from said transverse member.

10. The racing sulky of claim 9, wherein said seat extends upwardly in relation to said rails forming an angle within a range of about 150°–175° therebetween.

11. The racing sulky of claim 10, wherein said angle is about 166°.

12. The racing sulky of claim 10, wherein said first, second, and third segments extend upwardly at the same angle and wherein said fourth segment is parallel to the ground plane.

13. The racing sulky of claim 9, wherein said second and fourth segments are substantially parallel to a center line.

14. The racing sulky of claim 13, wherein each of said outer support arms is divided into a first arm segment extending forwardly substantially parallel to said center line and upwardly from a lower end of said outer strut, and a second arm segment extending inwardly from said first arm segment attaching to said rails.

15. The racing sulky of claim 14, further comprising a pair of stirrups extending inwardly from said rails located adjacent said second segment.

16. The racing sulky of claim 8, wherein both of said struts extend forwardly at an angle in the range of about 15°–45° relative to a vertical plane passing through the center of said wheel.

17. The racing sulky of claim 16, wherein said struts are disposed at an angle of about 25° relative to said vertical plane.

* * * * *